(12) United States Patent
Bestmann

(10) Patent No.: US 9,471,858 B2
(45) Date of Patent: Oct. 18, 2016

(54) METHOD FOR CONVERTING SPECTRAL CHARACTERIZATION DATA

(71) Applicant: HEIDELBERGER DRUCKMASCHINEN AG, Heidelberg (DE)

(72) Inventor: Guenter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/628,437

(22) Filed: Feb. 23, 2015

(65) Prior Publication Data
US 2015/0242732 A1    Aug. 27, 2015

(30) Foreign Application Priority Data

Feb. 21, 2014 (DE) .................. 10 2014 002 509

(51) Int. Cl.
*G06F 15/00* (2006.01)
*G06K 15/02* (2006.01)
*B41F 33/00* (2006.01)
*H04N 1/60* (2006.01)

(52) U.S. Cl.
CPC ....... *G06K 15/1878* (2013.01); *B41F 33/0045* (2013.01); *H04N 1/605* (2013.01); *H04N 1/6016* (2013.01); *B41P 2233/11* (2013.01)

(58) Field of Classification Search
None
See application file for complete search history.

(56) References Cited

U.S. PATENT DOCUMENTS

| 6,041,708 | A | 3/2000 | Kipphan et al. |
| 8,159,719 | B2 | 4/2012 | Bestmann |
| 8,654,395 | B2 | 2/2014 | Bestmann |
| 8,810,857 | B2 | 8/2014 | Bestmann |
| 2012/0250095 | A1 | 10/2012 | Bestmann |
| 2013/0250322 | A1* | 9/2013 | Kawabata ............... H04N 1/60 358/1.9 |
| 2014/0376007 | A1* | 12/2014 | Hirano ............... G03G 15/0142 358/1.1 |
| 2015/0158309 | A1* | 6/2015 | Fujii ................ G01N 21/251 347/19 |

FOREIGN PATENT DOCUMENTS

| DE | 102006048556 A1 | 5/2007 |
| DE | 102008031735 A1 | 1/2009 |
| DE | 102008045661 A1 | 4/2009 |
| DE | 102010007858 A1 | 8/2011 |
| DE | 102011015306 A1 | 10/2012 |
| EP | 0228347 A1 | 7/1987 |
| EP | 0649743 A1 | 4/1995 |
| EP | 2506559 A2 | 10/2012 |

* cited by examiner

*Primary Examiner* — Helen Q Zong
(74) *Attorney, Agent, or Firm* — Laurence A. Greenberg; Werner H. Stemer; Ralph E. Locher

(57) ABSTRACT

A method controls the coloring of a printing press. In the method a test element is printed with a number of colored measuring areas. The printed colored measuring areas of the test element are then measured. Actual colorimetric values are calculated from the measured color values and then displayed. Reference colorimetric values are entered and adapted spectral color values are calculated. Densitometric, colorimetric, or spectral actual tonal values or actual tonal value gains are determined from the calculated actual colorimetric values of a subset of the colored areas of the test element. The densitometric, colorimetric or spectral reference tonal values or the reference tonal value gains are entered and adapted spectral color values are calculated by a comparison with the calculated actual colorimetric values. The adapted spectral color values for the calculation of color profiles, process calibrations and process control values are stored and the printing press is activated.

9 Claims, 3 Drawing Sheets

| Tonal values | |
|---|---|
| X | Y |
| 0.00 | 0.00 |
| 5.00 | 5.70 |
| 10.00 | 10.90 |
| 20.00 | 20.50 |
| 30.00 | 30.20 |
| 40.00 | 39.50 |
| 50.00 | 49.30 |
| 60.00 | 59.00 |
| 70.00 | 69.10 |
| 80.00 | 78.00 |
| 90.00 | 88.70 |
| 95.00 | 94.20 |
| 100.00 | 100.00 |

| Tonal values | |
|---|---|
| X | Y |
| 0.00 | 0.00 |
| 5.00 | 5.70 |
| 10.00 | 10.90 |
| 20.00 | 20.50 |
| 30.00 | 30.20 |
| 40.00 | 39.50 |
| 50.00 | 49.30 |
| 60.00 | 59.00 |
| 70.00 | 69.10 |
| 80.00 | 78.00 |
| 90.00 | 88.70 |
| 95.00 | 94.20 |
| 100.00 | 100.00 |

| Tonal values | |
|---|---|
| X | Y |
| 0.00 | 0.00 |
| 7.00 | 5.00 |
| 14.01 | 10.00 |
| 27.64 | 20.00 |
| 40.70 | 30.00 |
| 53.00 | 40.00 |
| 64.34 | 50.00 |
| 74.53 | 60.00 |
| 83.39 | 70.00 |
| 90.72 | 80.00 |
| 96.32 | 90.00 |
| 98.40 | 95.00 |
| 100.00 | 100.00 |

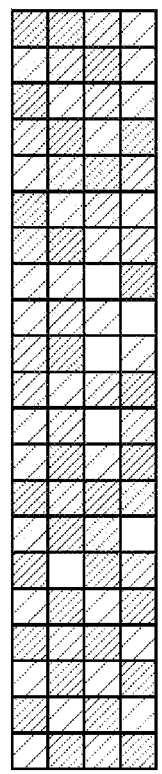
Fig. 3
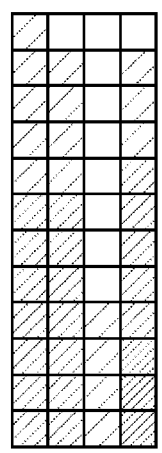

METHOD FOR CONVERTING SPECTRAL CHARACTERIZATION DATA

CROSS-REFERENCE TO RELATED APPLICATION

This application claims the priority, under 35 U.S.C. §119, of German patent application No. 10 2014 002 509.8, filed Feb. 21, 2014; the prior application is herewith incorporated by reference in its entirety.

SUMMARY OF THE INVENTION

The invention describes a method for converting spectral characterization data from a printing process to one or more predefined color values and/or to one or more predefined tonal values or tonal value gains. The method includes the following steps of:
a) printing a test element with a suitably selected number of colored areas and measuring the colored areas of the test element with a spectrophotometer;
b) calculating the actual colorimetric values and displaying selected color values on an output unit, entering reference colorimetric values and converting the spectral data;
c) calculating the densitometric, colorimetric or spectral actual tonal values or actual tonal value gains from a subset of the spectral data and displaying on an output unit, entering densitometric, colorimetric or spectral reference tonal values or reference tonal value gains and converting the spectral data; and
d) storing the converted spectral data in a data format suitable for the calculation of ICC color profiles, process calibrations and process control values.

The method is based on published, non-prosecuted German patent application DE 10 201 0 007 858A1, corresponding to U.S. Pat. No. 8,654,395. The method described there for calculating colorimetrically defined characterization data for process calibration, process profiling and process control of printing processes is a constituent part of this invention and is therefore incorporated by reference herein. However, the method can also be applied to other suitable spectral data by using other suitable calculation methods, independently of published, non-prosecuted German patent application DE 10 2010 007 858A1.

Color management and digital data exchange of documents require unambiguous relationships between the digital tonal values and the printed color values. As a rule, the digital tonal values are present as process colors CMYK. In packaging printing, individual process colors or a plurality thereof can be replaced by other product-specific colors. For example, the process color magenta can be replaced by a red printing ink. The printed color values depend on the printing process (sheet-fed offset printing, web-fed offset printing), on the process standard (inking of the solid tones, tonal value growth of the process colors) and on the materials used (printing material, printing ink). The digital tonal values (screen percentages) and the associated color values (CIELAB, CIEXYZ and/or spectra) are usually described by the term characterization data. In addition to the conventional 4-color printing, there are further processes using fewer or more printing inks, these printing inks or some of these printing inks generally being special inks. Corresponding characterization data can also be obtained for this purpose.

From the characterization data, color profiles for the separation of images and graphics and also guidelines for process calibration and for process control are obtained.

Characterization data sets are determined with the aid of test elements. The test element according to ISO 12642-2 [2], which is composed of defined colored areas of the process colors CMYK, is known. In addition to this standard test element, there can be further manufacturer-specific test elements and further developments of ISO 12642-2 for general application with still finer sampling of the color space.

Other features which are considered as characteristic for the invention are set forth in the appended claims.

Although the invention is illustrated and described herein as embodied in a method for converting spectral characterization data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2A is a graph illustrating a print/data tonal value curve; and

FIG. 3 is an illustration showing an example of an optimized test element.

DETAILED DESCRIPTION OF THE INVENTION

Figures 1, 1A:
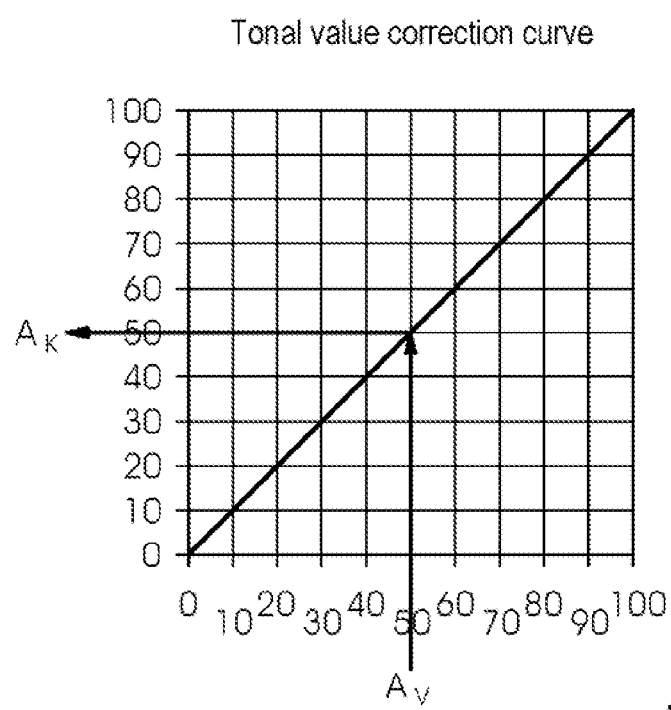
FIG. 1 is an illustration of a first table showing tonal values.
FIG. 1A is a graph illustrating a tonal value correction curve.

We now discuss exemplary test elements (visual and random) according to ISO 12642-2:2006 (1617 colored areas).

Standardized characterization data sets for defined printing conditions have been determined for process standards that are used in America and Germany. In addition, there are further individual characterization data sets from various organizations, printing works and publishers. All these data sets are distinguished by the fact that there are no spectra relating to the individual values. In published, non-prosecuted German patent application DE 10 201 0 007 858 A1, a method for calculating characterization data from an optimized test element is described, managing with a very low number of colored areas.

FIG. 3 shows an example of an optimized test element according to German patent application DE 10 201 0 007 858A1 (132 colored areas). From the test element, with the aid of the modified and segmented spectral Neugebauer equations, standardized characterization data sets can be calculated. These data sets are distinguished by the fact that there are spectra relating to the individual color values and the spectra of any desired tonal value combinations can be calculated. For printing processes having fewer or more than four printing inks, it is possible to generate corresponding optimized test elements, in particular including optimized test elements with a low number of colored areas. With respect to the color values and the tonal value gains, printing processes exhibit deviations with respect to the envisaged process standard. These deviations are reflected in the characterization data. If it is wished to generate characterization data which describes the process standard exactly, adaptations to the data are necessary. These adaptations are possible by using programs such as the Prinect Color Toolbox from Heidelberger Druckmaschinen AG. Since these methods are based on colorimetric data, following a corresponding adaptation the possibly originally present spectral data are no longer valid and must be discarded. In the method described here for adapting spectral measured values to defined predefinitions, the spectral data is maintained.

The principles of colorimetry are now discussed.

Color sensation $C_i$ is a function of the spectral reflection $r(\lambda)$ of an object, the spectral distribution of the source of illumination $l(\lambda)$ and the spectral sensitivities of the rods of the eye $s_i(\lambda)$.

$$C_i = \int_{\lambda min}^{\lambda max} l(\lambda) r(\lambda) s_i(\lambda) d\lambda \quad i=1,2,3 \tag{1}$$

By using the standardized spectral value curves of the standard observer $s_i(\lambda)=x(\lambda), y(\lambda), z(\lambda)$ and of the source of illumination $l(\lambda)=l_{D50}(\lambda)$, the result is the color values $C_i=X, Y, Z$.

$$X = \int_{\lambda min}^{\lambda max} l_{D50}(\lambda) r(\lambda) x(\lambda) d\lambda \tag{2a}$$

$$Y = \int_{\lambda min}^{\lambda max} l_{D50}(\lambda) r(\lambda) y(\lambda) d\lambda \tag{2b}$$

$$Z = \int_{\lambda min}^{\lambda max} l_{D50}(\lambda) r(\lambda) z(\lambda) d\lambda \tag{2c}$$

Since the spectral values $r(\lambda)$ are normally measured at discrete values of l, summing over a defined value range is carried out.

$$X = \Sigma_{\lambda min}^{\lambda max} l_{iD50} r_i x_i \tag{3a}$$

$$Y = \Sigma_{\lambda min}^{\lambda max} l_{iD50} r_i y_i \tag{3b}$$

$$Z = \Sigma_{\lambda min}^{\lambda max} l_{iD50} r_i z_i \tag{3c}$$

The value range of the spectrum for this application normally lies in the visible range from about 380 nm to 730 nm with a resolution of 10 nm. The spectral values of the source of illumination $l_{iD50}(\lambda)$ and the spectral value curves $x_i$ $y_i$ $z_i$ are standardized and are available in table form. The $l_{iD50}$ and the $x_i$ $y_i$ $z_i$ are usually combined and normalized.

$$X = \Sigma_{\lambda min}^{\lambda max} r_i x_{iD50} \tag{4a}$$

$$Y = \Sigma_{\lambda min}^{\lambda max} r_i y_{iD50} \tag{4b}$$

$$Z = \Sigma_{\lambda min}^{\lambda max} r_i z_{iD50} \tag{4c}$$

The XYZ color values can be converted into LAB color values with the usual methods. From the spectra themselves, in a similar way to that in (4a) to (4c), density values can be calculated. Instead of the spectral value curves, in this case the assessment curves of the desired density standard are used. The calculation methods are described extensively in the ISO standards ISO 13655 [3] and ISO 5-3 [1].

The conversion of spectral color values is now discussed.

The method is based on a specific modification of the spectral measured values of the paper (printing material) and of the printed paper. Here, it is expedient not to change individual spectral values but always to change groups of spectral values. This is associated with the fact that changes to the paper white and the printing ink always relate to the whole of the spectral values and not the individual spectral values. The modification of individual spectral values does not lead to the objective.

The spectrum of a tonal value $r_i$ is given. By using the formulas 4a to 4c, the XYZ color values and, from the latter, the derived LAB color values are calculated. The LAB color values are displayed on an output unit as actual color values $LAB_{act}$. The actual color value can be assigned a reference color value $LAB_{ref}$ by the user. The difference dE between the two color values can be calculated in accordance with [3].

$$dE = \sqrt{(L_{ref}-L_{act})^2 + (a_{ref}-a_{act})^2 + (b_{ref}-b_{act})^2} \tag{5}$$

The object of the method is to modify the spectral values such that the difference dE becomes minimal, in the ideal case 0.

The minimization of the difference dE is equivalent to a minimization of the difference of the XYZ color values. If the difference between the reference color values $XYZ_{ref}$ and the actual color values $XYZ_{act}$ is minimal, the difference dE is also minimal.

Starting from the formulas 4a to 4c, it is therefore recommended to optimize (a) the spectral value curves $x_{iD50}$, $y_{iD50}$ and $z_{iD50}$ or (b) the spectral values $r_i$ such that the actual color value $XYZ_{act}$ becomes as equal as possible to the reference color value $XYZ_{ref}$. There are different optimization methods in the literature. One common method uses three coefficients $a_x$, $a_y$, $a_z$, with which the spectral values $x_{iD50}$, $y_{iD50}$ and $z_{iD50}$ are respectively multiplied.

In the case of method (a) it then follows that:

$$X = \Sigma_{\lambda min}^{\lambda max} r_i a_x x_{iD50} \tag{6a}$$

$$Y = \Sigma_{\lambda min}^{\lambda max} r_i a_y y_{iD50} \tag{6b}$$

$$Z = \Sigma_{\lambda min}^{\lambda max} r_i a_z z_{iD50} \tag{6c}$$

In the case of method (b) with the coefficients introduced above, a new spectrum is calculated from the spectrum to be optimized:

$$r_{inew} = \frac{(a_x x_{iD50} + a_y y_{iD50} + a_z z_{iD50})}{(x_{iD50} + y_{iD50} + z_{iD50})} * r_{iold} \tag{7}$$

The method (b) is used here, since it supplies better adapted values. The coefficients are increased and reduced in size iteratively, starting from a suitably selected starting value, until the desired result is reached. The starting value used can be the value 1 or, better, the ratio of $XYZ_{ref}$ and $XYZ_{act}$.

$$a_x = X_{ref}/X_{act} \tag{8a}$$

$$a_y = Y_{ref}/Y_{act} \tag{8b}$$

$$a_z = Z_{ref}/Z_{act} \tag{8c}$$

Using the given starting values, a first difference dE is calculated. Then the coefficients are varied upward and downward by a small value (e.g. by 0.001) and for each value, a new difference dE is determined. If the new minimal difference dE is smaller than the old difference dE, then the associated coefficient is used in a next iteration step. If no new difference dE value is smaller than the old difference dE value, the iteration cycle is terminated. For the purpose of further improvement, operations are now carried out with a smaller value for the variation of the coefficients. Halving the values (e.g. to 0.0005 in a second iteration cycle) is expedient.

The method is continued until no more improvement of the results is achieved. This can be a sufficiently small difference dE and/or else a very small value for the variation of the coefficients.

By using the coefficients determined in this way, a new spectrum is then calculated with formula 7. The conversion of the spectral values has therefore been completed.

In this method, three coefficients and three weighting functions were used. This has proven to be sufficient. An expansion to more coefficients and more suitable mutually overlapping weighting functions is possible.

The conversion of paper white is now discussed.

A change in the paper white influences all the color values which are printed on this paper. If the spectrum of the paper white is then converted, all other spectra of the characterization data must likewise be converted. This is likewise done on a spectral basis.

For this purpose, the spectra of the old paper white and of the new paper white are needed. A simple and sufficient method consists in the component-by-component conversion of all the spectral values of all the tonal values of the characterization data set.

$$r_{inew} = \frac{r_{iPapernew}}{r_{iPaperold}} \times r_{iold}. \tag{9}$$

From the converted spectra, the new XYZ and LAB color values and the densities can then be calculated.

The conversion of primary colors is now discussed.

The conversion of the primary colors is carried out as described in the general method. A change in the full tone (100%) of a process color influences the (screened) halftones. If in a characterization data set, apart from the tonal values required for the Neugebauer equations, there are further tonal values of the process color, these spectra must likewise be converted. If, for example, the tonal values 10, 20, 30, 40, 50, 60, 70, 80, 90% are present in a data set, the change in the spectrum of the full tones must be included proportionally in calculating the spectra of the tonal values. For this purpose, the spectra of the old full tone and of the new full tone are needed. A simple and sufficient method consists in the weighted inclusion of the spectral differences in the calculation. The weighting is carried out via the screen percentages A of the halftones which are greater than a minimum screen percentage $A_m$. An expedient value for $A_m$ is, for example, the segment value from the segmented spectral Neugebauer equations (typically 40 or 50%).

$$r_{inewA} = r_{ioldA} \times (r_{inew100\%} - r_{iold100\%}) \times (1-(100-A)/(100-A_m)) \tag{10}$$

From the converted spectra, the new XYZ and LAB color values and the densities can then be calculated.

The conversion of secondary colors is now discussed.

The conversion of secondary colors, i.e. the combined prints of primary colors or screened primary colors, is carried out as described in the general method. If appropriate, it is necessary for surrounding tonal values to be corrected additionally in a manner analogous to the above.

The conversion of spectral tonal values is now discussed.

Step wedges of the process colors, composed of suitably stepped tonal values, are used for process calibration. Individual tonal values defined in process standards such as ISO 12647-2 [4] are used for process control. There is therefore the need to print characterization data with defined tonal values. However, as a general rule, the printed values do not correspond with the predefinitions and must therefore be adapted.

The conversion method has two stages. In a first step, the tonal values of the characterization data set themselves are converted and then, in a second step, a re-calculation of the spectra is carried out by using the segmented spectral Neugebauer equations.

The conversion the tonal values is now discussed.

From the spectra of the paper, the screened process color values and the full tones of the process colors, the corresponding density values are calculated in accordance with [1]. Furthermore, colorimetric and spectral densities can also be calculated. Colorimetric densities are calculated from the XYZ color values in accordance with [3], spectral densities from the spectral values which exhibit maximum absorption. The latter is advantageous in particular in the case of special inks.

From the density values, the tonal values $A_D$ in the print can be determined:

$$A_D = \frac{10^{-D_0} - 10^{-D}}{10^{-D_0} - 10^{-D_n}}. \tag{11}$$

Here, $D_0$ is the density value of the paper, Dn the density value of the full tone and D the density of the screened tonal value for which the tonal value in the print is to be determined. The tonal value gain is obtained by means of subtraction of the tonal value of the original $A_V$.

$$TWZ = A_D - A_V \tag{12}.$$

The reference tonal value gains for the printing process are predefined in the process standard. In particular, ISO 12647-2 [4] defines a series of tonal value gains with different values in the medium tone and different curves. From a comparison between the measured actual tonal value gain and the reference tonal value gain, corrections for the tonal values can be determined.

Figure 2:
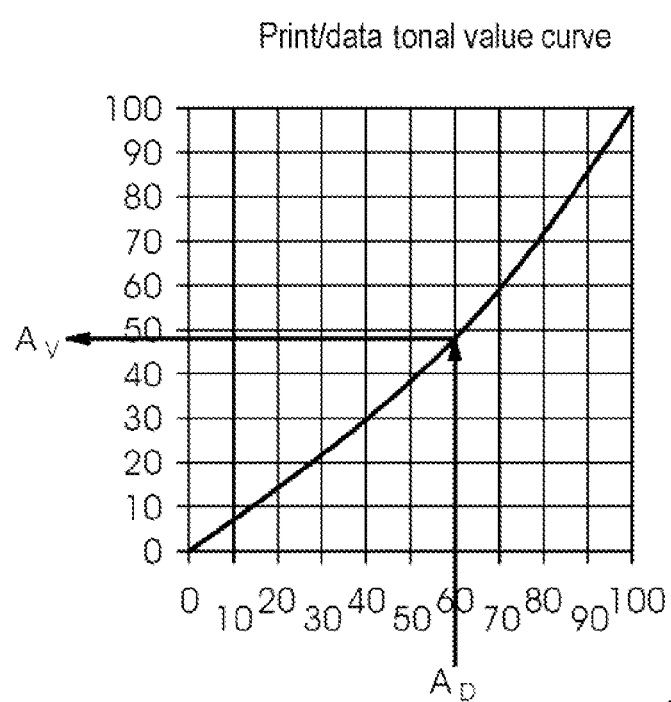
FIG. 2 is an illustration of a second table showing tonal values.

The table in FIG. 2 shows a typical tonal value curve for a printing process with a tonal value gain of 13% in the medium tone at 40%. This results in the tonal value of 53% in the print as a reference tonal value relating to a tonal value of 40% in the original.

The associated tonal value curve in FIG. 2A is illustrated inversely here, since in relation to the measured values of the print $A_D$ (X-axis), the associated tonal values in the file $A_V$ (Y-axis) are to be determined.

For all the measured tonal values of the print $A_P$, the tonal values of the original $A_V$ can now be determined by interpolation. If these values are plotted against the values actually to be expected in a correct printing process, a calibration curve for the tonal value gain is obtained. This is illustrated in the following table in FIG. 1. FIG. 1A shows the associated tonal value curve.

For each original color value it is now possible to determine a corrected value and to replace the tonal value from the characterization data with this value.

The conversion of the spectra is now discussed.

Following the conversion and calibration of the tonal values of the characterization data, one now has a file with tonal values deviating from the original. This file can be converted to the original tonal values with the aid of the segmented spectral Neugebauer equation. This can be done by using the method described in published, non-prosecuted German patent application DE 10 2010 007 858 A1.

Characterization data for the profiling, calibration and control of printing processes is obtained by means of prints of suitable test elements. On the basis of the process-specific fluctuations in the print, it is very difficult or impossible to determine data matched exactly to the process. Corrections are necessary. With the means that are currently available, these corrections to the measured data lead to a loss of the spectra. However, in many cases the spectra are necessary in order to adapt the original data to different density standards, for example, or to calculate colorimetrically defined data for new tonal values in advance from an existing data set.

The setting up of a printing process is now discussed.

Usually, a test form with various test elements for calibration and profiling is output on a plate exposer and printed. From some of the test elements, a calibration is calculated and applied in the plate exposer. The test form is printed again and if the tonal value gains and color values correspond to the standard within the scope of the tolerances thereof, a test element for profiling can be measured. At least two prints are needed. By using the above-described methods for the conversion of spectral data, the print for profiling can be saved by the data for profiling being converted from the first print.

The exact adaptation to a process standard is now discussed.

The above-described method can be used to adapt characterization data exactly to a predefined standard and at the same time to keep the spectral data.

The conversion of existing spectral characterization data to a modified printing process is likewise possible.

The methods are not restricted to four-color printing processes. They are also suitable in particular for the adaptation of tonal values and color values in spot colors, overprints of spot colors and multi-color printing processes.

The invention claimed is:

1. A method for controlling coloring in a printing process of a printing press by using a computer, which comprises the steps of:
    printing a test element with a selected number of colored measuring areas;
    measuring the colored measuring areas of the test element with a spectrophotometer;
    calculating actual colorimetric values from measured color values from the colored measuring areas of the test element;
    displaying selected actual color values on a display apparatus;
    entering reference colorimetric values and calculating adapted spectral color values from the reference colorimetric values;
    calculating densitometric, colorimetric or spectral actual tonal values or actual tonal value gains from calculated actual colorimetric values of a subset of the colored measuring areas of the test element measured with the spectrophotometer, and displaying on a display device;
    entering densitometric, colorimetric or spectral reference tonal values or reference tonal value gains and calculating adapted spectral color values by means of comparison with the calculated actual colorimetric values; and
    storing the adapted spectral color values for a calculation of color profiles, process calibrations and process control values and activating the printing press on a basis of the color profiles, the process calibrations and the process control values.

2. The method according to claim 1, which further comprises forming the test element with at least colored areas having process colors selected from the group consisting of cyan, magenta, yellow and black.

3. The method according to claim 1, which further comprises optimizing the test element with regard to the number of the colored measuring areas, in that spectra relating to individual color values are available, and in that the spectra of any desired tonal value combinations can be calculated.

4. The method according to claim 1, which further comprises using the computer to specifically modify spectral measured values from a printing material in an unprinted state and of a printed printing material.

5. The method according to claim 4, wherein the spectral measured values are modified group by group.

6. The method according to claim 1, which further comprises displaying color values on the display device as LAB color values.

7. The method according to claim 4, wherein a difference between reference color values entered and displayed actual color values is minimized in the computer, and the spectral measured values are modified appropriately by means of an adapted calculation.

8. The method according to claim 4, which further comprises carrying out a modification of the spectral measured values iteratively until a stop criterion is reached.

9. The method according to claim 1, which further comprises forming the test element to provide the colored measuring areas with spot colors.

* * * * *